United States Patent
Han et al.

(10) Patent No.: US 11,404,793 B2
(45) Date of Patent: Aug. 2, 2022

(54) MAGNETIC NANOSTRUCTURES AND COMPOSITES FOR MILLIMETER WAVE ABSORPTION

(71) Applicant: Lawrence Livermore National Security, LLC, Livermore, CA (US)

(72) Inventors: Jinkyu Han, San Ramon, CA (US); Thomas Han, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 222 days.

(21) Appl. No.: 16/712,812

(22) Filed: Dec. 12, 2019

(65) Prior Publication Data

US 2021/0184364 A1   Jun. 17, 2021

(51) Int. Cl.
   *H01Q 17/00* (2006.01)
   *B82Y 40/00* (2011.01)
   *B82Y 25/00* (2011.01)

(52) U.S. Cl.
   CPC .............. *H01Q 17/00* (2013.01); *B82Y 25/00* (2013.01); *B82Y 40/00* (2013.01)

(58) Field of Classification Search
   None
   See application file for complete search history.

(56) References Cited

U.S. PATENT DOCUMENTS

2016/0164187 A1* 6/2016 Ohkoshi .................. C09D 5/32
342/1

FOREIGN PATENT DOCUMENTS

JP   2011032496 A   *   2/2011
JP   2011035006 A   *   2/2011

OTHER PUBLICATIONS

Machine translation JP2011032496 (Year: 2011).*
Machine translation JP2011035006 (Year: 2011).*
Marra et al., "Electromagnetic wave absorption and structural properties of wide-band absorber made of graphene-printed glass-fibre composite," Scientific Reports, vol. 8:12029, Aug. 13, 2018, pp. 1-9.
Tucek et al., "e-Fe2O3: An Advanced Nanomaterial Exhibiting Giant Coercive Field, Millimeter-Wave Ferromagnetic Resonance, and Magnetoelectric Coupling," Chemistry of Materials Review, vol. 22, Oct. 27, 2010, pp. 6483-6505.
Ohkoshi et al., "A Millilmeter-Wave Absorber Based on Gallium-Substituted e-Iron Oxide Nanomagnets," Angewandte Chemie International Edition, vol. 46, Oct. 17, 2007, pp. 8392-8395.

* cited by examiner

*Primary Examiner* — Alexandre F Ferre
(74) *Attorney, Agent, or Firm* — Zilka-Kotab, P.C.

(57) ABSTRACT

A product includes a nanostructure having a core and a shell. The core has a coercive field of at least 3 kOe and the shell has a saturation magnetization of at least 50 emu per gram. A product includes a nanostructure having a core and a shell. The shell has a coercive field of at least 3 kOe and the core has a saturation magnetization of at least 50 emu per gram. A method includes forming core/shell nanostructures and forming millimeter wave absorbers including the core/shell nanostructures and a support structure.

26 Claims, 3 Drawing Sheets

MAGNETIC NANOSTRUCTURES AND COMPOSITES FOR MILLIMETER WAVE ABSORPTION

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to magnetic nanostructures and composites, and more particularly, this invention relates to magnetic nanostructures and composites for efficacious and lightweight millimeter wave absorbers.

BACKGROUND

Millimeter waves are crucial for next-generation electronic communication systems, e.g., 5G communication systems and beyond. The controls of electromagnetic interference (EMI) arising from the millimeter (mm) wave devices are in the early stages of development. Concerns associated with EMI, especially EMI stemming from mm waves, include leakage of confidential information and/or targets, the malfunction of electronic devices, impairments to human health, etc. The development of desirable mm wave absorbers is a challenge due to difficulties in fabricating suitable magnetic absorbers in mm regimes. Millimeter wave absorbers are particularly of interest and importance in miniaturized high frequency electronic devices. It is desirable to fabricate mm wave absorbers to address the concerns associated with next-generation electronic communication systems.

SUMMARY

A product, according to one configuration, includes a nanostructure having a core and a shell. The core has a coercive field of at least 3 kOe and the shell has a saturation magnetization of at least 50 emu per gram.

A product, according to another configuration, includes a nanostructure having a core and a shell. The shell has a coercive field of at least 3 kOe and the core has a saturation magnetization of at least 50 emu per gram.

A method, according to yet another configuration, includes forming core/shell nanostructures and forming millimeter wave absorbers including the core/shell nanostructures and a support structure.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
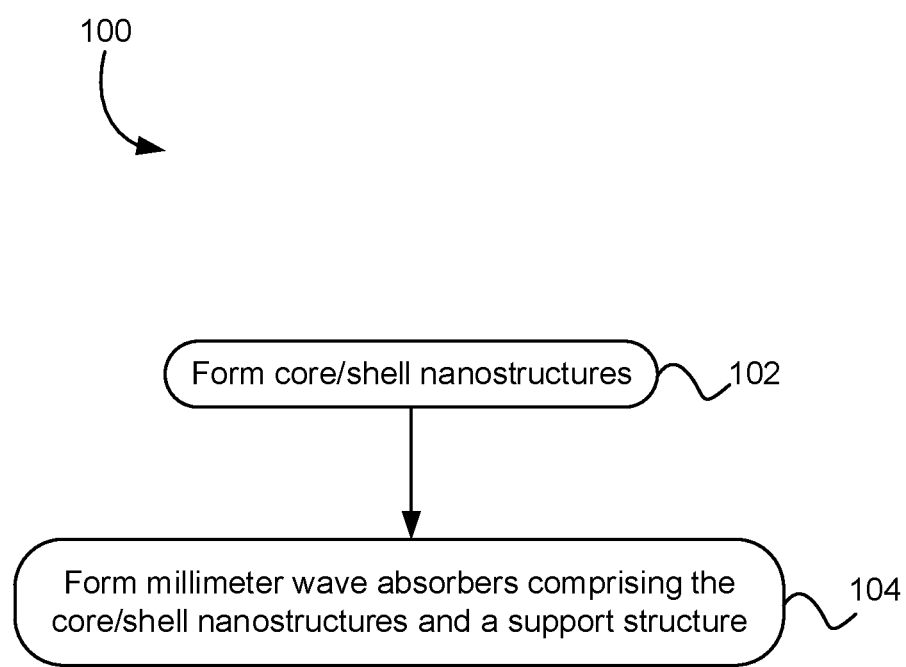
FIG. 1 is a flowchart of a method, according to one configuration of the presently disclosed inventive concepts.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred approaches of magnetic nanostructures and composites for efficacious and lightweight millimeter wave absorbers and/or related systems and methods.

In one general configuration, a product includes a nanostructure having a core and a shell. The core has a coercive field of at least 3 kOe and the shell has a saturation magnetization of at least 50 emu per gram.

In another general configuration, a product includes a nanostructure having a core and a shell. The shell has a coercive field of at least 3 kOe and the core has a saturation magnetization of at least 50 emu per gram.

In yet another general configuration, a method includes forming core/shell nanostructures and forming millimeter wave absorbers including the core/shell nanostructures and a support structure.

Millimeter wave devices are developed for various applications such as high-speed wireless electronics, radar, automotive, electronic warfare, etc. The mm wave spectral region sits between the microwave and the infrared bands. Specifically, the mm wave spectral region is between about 30 GHz and about 300 GHz. As the conventional frequency of communication systems changes from micro to mm waves, higher transmission rates, reliability, capacity, etc., are anticipated for next-generation electronics. The relatively high frequency of mm waves are useful for transmitting large amounts of data.

The development of desirable mm wave absorbers is a challenge due to difficulties in fabricating suitable magnetic absorbers in mm regimes. Millimeter wave absorbers are particularly of interest and importance in miniaturized high frequency electronic devices.

Conventional approaches to controlling EMI include high tolerance manufacturing techniques and EM "shielding" materials. However, efficient EMI "absorbers," as presented herein, provide a preferable alternative for absorbing EMI in the mm wave range. For example, spurious signals cause system interference in high frequency devices which have powerful transmitters and sensitive receivers in close proximity inside a cavity. Thus, an "absorbing" rather than a "shielding" material would be ideal to reduce cross-talk and eliminate reflections from other parts of the device which interfere with the desired signals.

Traditional EM absorbers are much less effective for the mm wave scale due to the reduced wavelengths and increased frequencies. Specifically, conventional absorbers, such as ferrites, lose effectiveness dramatically at above approximately 40 GHz. Most conventional mm wave absorbers are purely dielectric, making conventional mm wave absorbers unsuitable for applications where a magnetic field is present. The lacking performance of conventional mm wave absorbers is due, at least in part, to the lack of magnetic absorption. Early developing magnetic materials with high mm wave absorption coefficients are difficult to fabricate with high quality materials. Structures with desired magnetic properties are difficult to construct and formulate.

Various approaches presented herein provide magnetic core/shell nanostructures for efficient mm wave absorption. The efficacious and lightweight mm wave absorbers use carbon-based aerogel composites in conjunction with the magnetic core/shell nanostructures in at least some approaches. The mm wave absorbers disclosed herein significantly improve mm wave absorption efficiency, communication, information security, etc., as electronic communication systems continue to revolutionize.

Magnetic mm wave absorbers, as presented herein, exhibit high responsivity toward both electric (e.g., permittivity) and magnetic (e.g., permeability) fields with a high magnetic loss.

Various approaches of the mm wave absorbers presented herein may be used to control EM pollution resulting from 5G electronic communication systems and/or any other electronic communication systems known in the art including EMI from mobile phones, laptops, automated vehicles, aviation electronics, radar, military toolkits, etc. The mm wave absorbers may be adapted to control EMI pollution resulting from electronic communication systems developed in the future as would be understood by one having ordinary skill in the art upon reading the present disclosure.

In preferred approaches, the mm wave absorbers comprise at least one material having a large coercive field ($H_c$). A large coercive field is a coercive field that is between about 3 and about 20 kilo-oersted (kOe). In a preferred approach, a large coercive field is at least 3 kOe. In other preferred approaches, a large coercive field is at least 5 kOe. In various approaches, the core/shell nanostructure has a large coercive field. The core and/or the shell may comprise a material having a large coercive field. In one configuration, the core has a larger coercive field relative to the shell. In another configuration, the shell has a larger coercive field relative to the core. Magnetic materials absorb EM waves through natural resonance. The resonance frequency is proportional to the $H_c$. Materials having an $H_c$ greater than or equal to 3 kOe have a resonance frequency in the mm wave range.

In preferred approaches, the core and/or the shell comprises a magnetic material. Magnetic materials may include ferrites, cobalt, nickel, iron, etc. Magnetic materials may include alloys comprising ferrites, cobalt, nickel, iron, etc. Magnetic materials preferably exhibit a propensity to absorb mm waves.

In other approaches, the core and/or the shell having a large coercive field may comprise dopant materials. Dopant materials may include gallium, lutetium, aluminum, etc. Dopant materials may be added to the core and/or the shell having a large coercive field to adjust the coercive field as would be understood by one having ordinary skill in the art upon reading the present disclosure. In other approaches, the core and/or shell having a large saturation magnetization, to be discussed in detail below, may comprise any dopant material(s) described herein.

In various approaches, the core and/or the shell having a large coercive field may comprise dopant materials and a particle size in the range between about 6 nm and about 20 nm. In one approach, the core and/or the shell in combination with the dopant material(s) have a particle size in the range between about 6 nm and about 20 nm. In another approach, the dopant materials may have a particle size in the range between about 6 nm and about 20 nm. Specifically, a particle size within this range is preferred where $H_c$ increases from about 2 kOe to about 20 kOe as particle size increases from about 6 nm and about 20 nm.

In some approaches, adding dopant to the core and/or the shell affects the efficient mm wave absorption. For example, the frequency of wave absorption may be changed depending on the material composition of the magnetic materials. Specifically, the mm wave absorbers may change from absorbing waves from about 28 GHz to about 40 GHz to absorbing waves from about 75 GHz to about 200 GHz depending on the composition of the magnetic materials and/or the dopants.

In preferred approaches, the mm wave absorbers comprise at least one material having a large saturation magnetization ($M_S$). A large saturation magnetization is a saturation magnetization that is at least 50 emu/gram. In other approaches, the large saturation magnetization is at least 100 emu/gram. In various approaches, the core/shell nanostructure comprises a material having a large saturation magnetization. In one configuration, the core has a larger saturation magnetization relative to the shell. In another configuration, the shell has a larger saturation magnetization relative to the core. Permeability tends to decrease with increasing resonance frequency according to Snoek's limit (e.g., $\mu \cdot fFMR = vM_S/3$ where $\mu$ is the relative permeability, fFMR is resonance frequency, and v is a gyromagnetic constant). Millimeter wave absorbers as discussed herein comprise materials with a relatively larger $M_S$ (e.g., a larger Snoek's limit).

The combination of the relatively large coercive field and relatively large saturation magnetization of the core/shell nanostructures achieves enhanced absorption intensity and broader bandwidths for absorbing mm waves. Furthermore, the core/shell nanostructures described herein exhibit synergistic effects for enhanced mm wave absorption where materials comprising the core and/or the shell may not exhibit any mm wave absorption individually.

In preferred approaches, the core of the nanostructure comprises at least one material having a relatively large saturation magnetization. Materials having a relatively large saturation magnetization include iron, cobalt, cobalt-iron alloys, nickel, nickel-iron alloys, manganese ferrites, zinc ferrites, etc.

In preferred approaches, the shell of the nanostructure comprises at least one material having a relatively large coercive field. Materials having a relatively large coercive field include ε-iron(III) oxide ($Fe_2O_3$), $Fe_2O_3$ alloys, FePt, carbon nanotubes, aerogels, graphene, carbon fibers, carbon-based materials, etc.

It should be understood by one having ordinary skill in the art that the materials of the core and the shell of the nanostructure may be interchangeable in various approaches. Specifically, the shell of the nanostructure may comprise at least one material having a relatively large saturation magnetization and the core of the nanostructure may comprise at least one material having a relatively large coercive field.

In preferred approaches, the core/shell nanostructure has a thickness that is less than or equal to 100 nm to accommodate skin depth effects. In other approaches, the resulting structure (e.g., the mm wave absorber) comprising the core/shell nanostructure(s) and a support structure, to be described in detail below, has a thickness that is less than or equal to 100 nm to accommodate skin depth effects. The skin depth effect associated with nanostructuring of the core/shell nanostructure provides that when high frequency EM waves encounter the materials described herein which form the core/shell nanostructure, the EM waves penetrate only the near-surface region (e.g., for Co, about 100 nm at 100 GHz) and the remaining interior portion of the core/shell nanostructure makes a relatively small to zero contribution to EM response. The skin depth decreases with increasing frequency. In a preferred configuration, the core/shell nanostructure has an effective thickness for absorbing waves having a frequency between 30 GHz and 300 GHz (e.g., the mm wave spectral region). In another preferred configuration, the resulting structure (e.g., the mm wave absorber) comprising the core/shell nanostructure(s) and a support structure has an effective thickness for absorbing waves having a frequency between 30 GHz and 300 GHz (e.g., the mm wave spectral region). The materials and/or the thickness of the core/shell nanostructure may be optimized for absorbing relatively higher rates of mm wave absorption.

In various approaches, the mm wave absorption performance of the core/shell nanostructures may be enhanced by fabricating 3-dimensional (3D) porous structures for supporting and/or distributing the core/shell nanostructures. In one configuration, a support structure supports a plurality of core/shell nanostructures. In a preferred configuration, the support structure comprises carbon nanotubes (CNTs). Specifically, the support structure may comprise CNT composites for lightweight and enhanced mm wave absorption capability. CNT composite materials are characterized by dielectric EM loss mechanisms. Support CNT aerogel composite structures, in combination with core/shell nanostructures, enhance mm wave absorption due to a synergism between the large dielectric properties and the magnetic loss properties associated with each material. In other approaches, the support structure includes carbon-based aerogels, standard binders, polymeric binders, silicon, polymeric foam, etc., which may provide similarly synergistic effects.

In various approaches, the support structure enhances the mm wave absorbance. For example, carbon aerogels alone do not have efficient mm wave absorption, however, the combination of carbon aerogels and the core/shell nanostructure provides a synergistic effect on the performance of the mm wave absorbers. Furthermore, carbon aerogels alone are not magnetic and thus are not sufficient to be used where a magnetic field is present, and the absorption performance of carbon aerogels alone is not sufficient due to lack of magnetic absorption.

In preferred approaches, the core/shell nanostructures and/or the support structure are relatively lightweight. The support structure decreases the density of the mm wave absorbers. The performance of conventional magnetic absorbers is decreased due to the relatively high density of the absorbing structures. The support structure of the present disclosure addresses conventional drawbacks by facilitating and enhancing mm wave energy dissipation by providing multiple scattering events from many homogenously-dispersed internal pores.

In another approach, the core/shell nanostructure may be substantially surrounded by a dielectric outer layer external to the core/shell nanostructure. For example, a core/shell nanostructure is a spherical form factor comprising an outermost layer comprising a dielectric material. In another example, a core/shell nanostructure is a stack of layers with an uppermost layer comprising a dielectric material. The dielectric material may be ceramic, ceramic composites, polyethylene, etc.

In various approaches, the core/shell nanostructures are spherical in shape and/or form factor. In another approach, the core is a lower layer and the shell is an upper layer in a substantially flat stack of layers. In yet other approaches, the core/shell nanostructures are a form factor comprising a wrap cylinder, coated wire, rods, etc.

FIG. 1 shows a method 100 in accordance with one configuration. As an option, the present method 100 may be implemented to construct mm wave absorbers such as those shown in the other FIGS. described herein. Of course, however, this method 100 and others presented herein may be used to form structures for a wide variety of devices and/or purposes, provide applications which may or may not be related to the illustrative approaches listed herein. Further, the methods presented herein may be carried out in any desired environment. Moreover, more or less operations than those shown in FIG. 1 may be included in method 100, according to various approaches. It should also be noted that any of the aforementioned features may be used in any of the approaches described in accordance with the various methods.

As shown in FIG. 1, method 100 includes operation 102. Operation 102 includes forming core/shell nanostructures. In various approaches, the core/shell nanostructures comprise a core and a shell. In preferred approaches, forming the core/shell nanostructures comprises at least some of the approaches described in detail above.

In one approach, the core comprises metal nanoparticles having a large saturation magnetization. As referred to throughout the present disclosure, a large saturation magnetization refers to a saturation magnetization of at least 50 emu/gram. The core may comprise Fe, Co, FeCo, Mn—Zn ferrite, etc. In some approaches, various known wet-chemistry techniques may be used to fabricate monodispersed nanoparticles. In preferred configurations, thermal decomposition of metal precursors is used to fabricate monodispersed nanoparticles with relatively higher crystallinity and/or phase purity compared to other fabrication methods known in the art. In one exemplary approach, the core is formed according to at least some of the approaches described with reference to FIG. 2, discussed in detail below.

In various approaches, the core is coated with a shell. The shell preferably comprises at least one material having a relatively large coercive field. As referred to throughout the present disclosure, a large coercive field is a coercive field of at least 3 kOe. Method 100 may include coating the core with the shell in any manner known in the art in view of various synthesis techniques and the combination of materials.

In one approach, the shell is applied according to a three-step process. For example, the shell may be applied according to at least some of the approaches described in detail below with reference to FIGS. 2 and 3. The shell material may be applied to the core material by forced hydrolysis of an aqueous solution in the presence of a shape controlling agent. A silica coating may be prepared by hydrolysis and polycondensation techniques known to one having ordinary skill in the art. The final shell product for coating the core material may be obtained by thermally treating the precursor materials described above and etching out the silicon coating (e.g., $SiO_2$) in at least some approaches.

Various synthesis protocols known in the art such as seed-mediated growth and/or thermal decomposition methods may be adapted to optimize formation of the core and/or the shell materials and/or formation of the core/shell nanostructure as would be understood by a skilled artisan upon reading the present disclosure and in view of the intended frequency range for wave absorption.

In a preferred approach, a nanostructure comprises a core and a shell. In this approach, the core has a coercive field of at least 3 kOe and the shell has a saturation magnetization of at least 50 emu per gram.

In another preferred approach, a nanostructure comprises a core and a shell. In this approach, the shell has a coercive field of at least 3 kOe and the core has a saturation magnetization of at least 50 emu per gram.

Operation 104 includes forming millimeter wave absorbers comprising the core/shell nanostructures and a support structure.

In preferred configurations, mm wave absorbers comprise the core/shell nanostructures described herein and a support structure. The support structure preferably comprises carbon nanotubes for forming lightweight mm wave absorbers (e.g., relative to conventional, bulky wave absorbers). The mm wave absorbers may be formed by synthesizing CNT-core/shell conjugates according to chemical bonding protocols (e.g., covalent/non-covalent schemes) in at least some approaches. Using the CNT-core/shell composites, a free-standing, magnetically functionalized CNT-core/shell aerogel may be formed by crosslinking individual conjugates into hydrogel networks. Any known supercritical drying and/or freeze drying technique known in the art may be used to obtain the final CNT-core/shell aerogel product.

In various other approaches, the support structure may comprise carbon-based aerogels, standard binders, polymeric binders, silicon, polymeric foam, etc. The mm wave absorbers comprising the core/shell nanostructures described herein and the support structure may be formed according to similar approaches as would be apparent to one having ordinary skill in the art upon reading the present disclosure.

Figure 2:
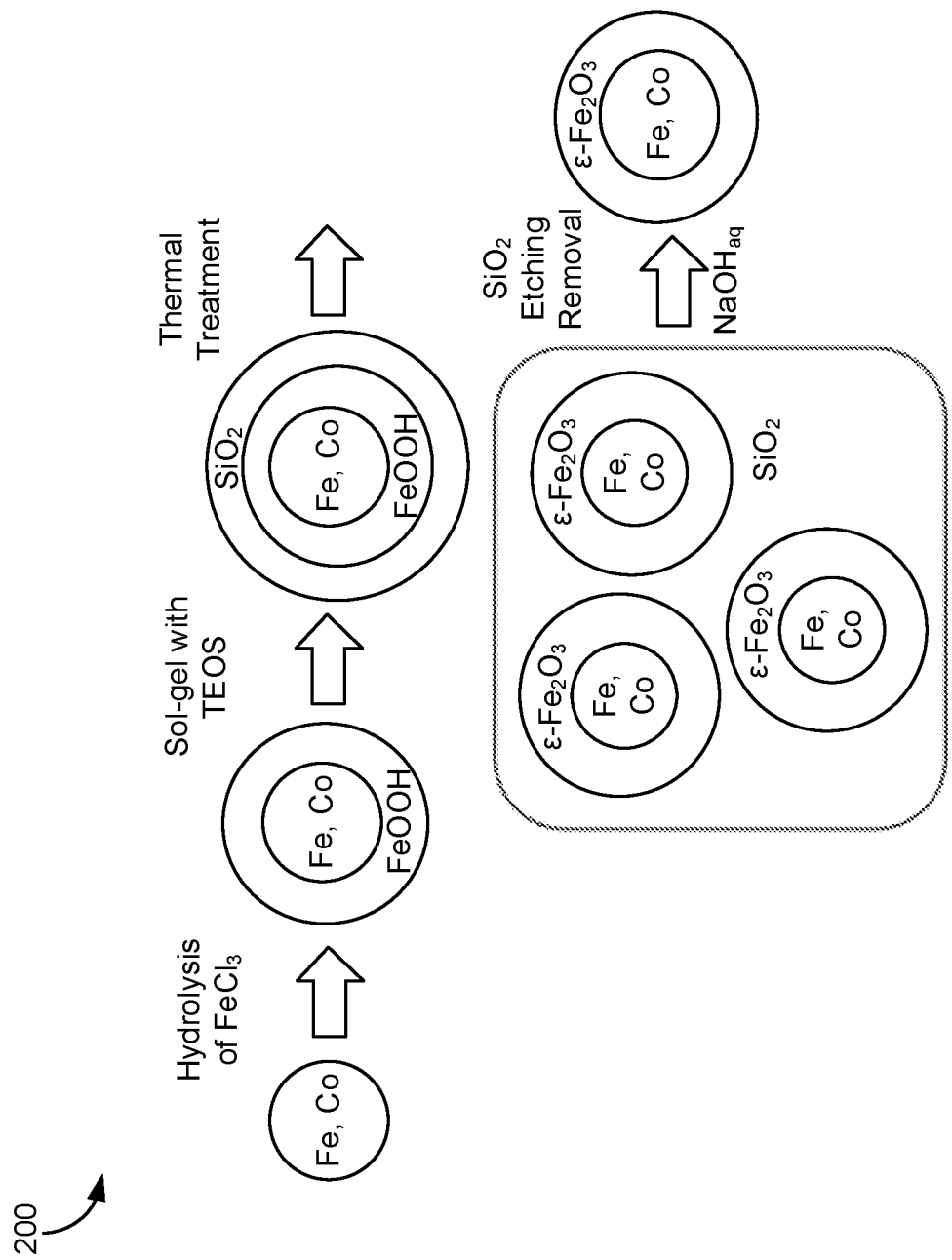
FIG. 2 is a schematic representation of an exemplary synthesis procedure of iron (Fe) and/or cobalt-iron(III) oxide (Co/ε-$Fe_2O_3$) core/shell nanostructures according to one configuration of the presently disclosed inventive concepts.

FIG. 2 is a schematic representation of an exemplary synthetic procedure 200 of iron (Fe) and/or cobalt-iron(III) oxide (Co/ε-$Fe_2O_3$) core/shell nanostructures, in accordance with one configuration. As an option, the present procedure 200 may be implemented in conjunction with features from any other configuration listed herein, such as those described with reference to the other FIGS. Of course, however, such procedure 200 and others presented herein may be used in various applications and/or in permutations which may or may not be specifically described in the illustrative approaches listed herein. Further, the procedure 200 presented herein may be used in any desired environment.

Conventional challenges for generating high performance mm wave magnetic absorbers are due to the difficulty of fabricating magnetic nanostructures having both large coercive fields and large saturation magnetizations. The procedure 200 provides a synthetic procedure for synthesizing metal nanoparticles with larger saturation magnetization (e.g., Fe, Co, FeCo, etc.) using wet-chemistry and thermal decomposition of metal precursors.

The procedure 200 fabricates monodispersed nanoparticles with high crystallinity and phase purity. In one approach, the core materials are coated with ε-$Fe_2O_3$. The ε-$Fe_2O_3$ phase has been historically less studied than the other iron oxide polymorphs due to the complexity and difficulties in the synthesis (e.g., impurity, stability, etc.) of the metastable phase. ε-$Fe_2O_3$ nanocrystals have demonstrated a relatively large coercive field of 20 kOe at room temperature. The ε-$Fe_2O_3$ coating provides strong absorption of mm wave radiation. The relatively large coercive field is due to magnetocrystalline anisotropy arising from unique ε-$Fe_2O_3$ crystal structures and the formation of a single magnetic domain by nanocrystals with suitable size. The procedure 200 modifies the synthesis of the ε-$Fe_2O_3$ nanocrystals to fabricate the cores and/or the shells.

The ε-$Fe_2O_3$ shells are obtained by coating β-FeOOH on core materials prepared by the forced hydrolysis of an aqueous $FeCl_3$/HCl solution in the presence of a shape controlling agent. A silica coating (e.g., $SiO_2$) is performed at Fe, Co/β-FeOOH and prepared by the hydrolysis and polycondensation of tetraethyl orthosilicate (TEOS).

The Fe, Co/ε-$Fe_2O_3$ core/shell nanostructures are obtained by a controlled thermal treatment of the Fe, Co/ε-FeOOH/$SiO_2$ thermal precursors, followed by $SiO_2$ etching removal with concentrated $NaOH_{aq}$ (aqueous) solution.

The procedure 200 uses synthesized $SiO_2$ matrices to prevent particle growth or sintering, thereby generating uniform nanostructures at high reaction temperatures (e.g., about 900 degrees Celsius (° C.)) to generate ε-phase $Fe_2O_3$. The synthesis procedure 200 may be tuned to adjust the size of the cores and/or shells, thereby maximizing the coercive field and/or saturation magnetization for optimum mm wave absorption performance as would be understood by one having ordinary skill in the art upon reading the present disclosure.

Figure 3:
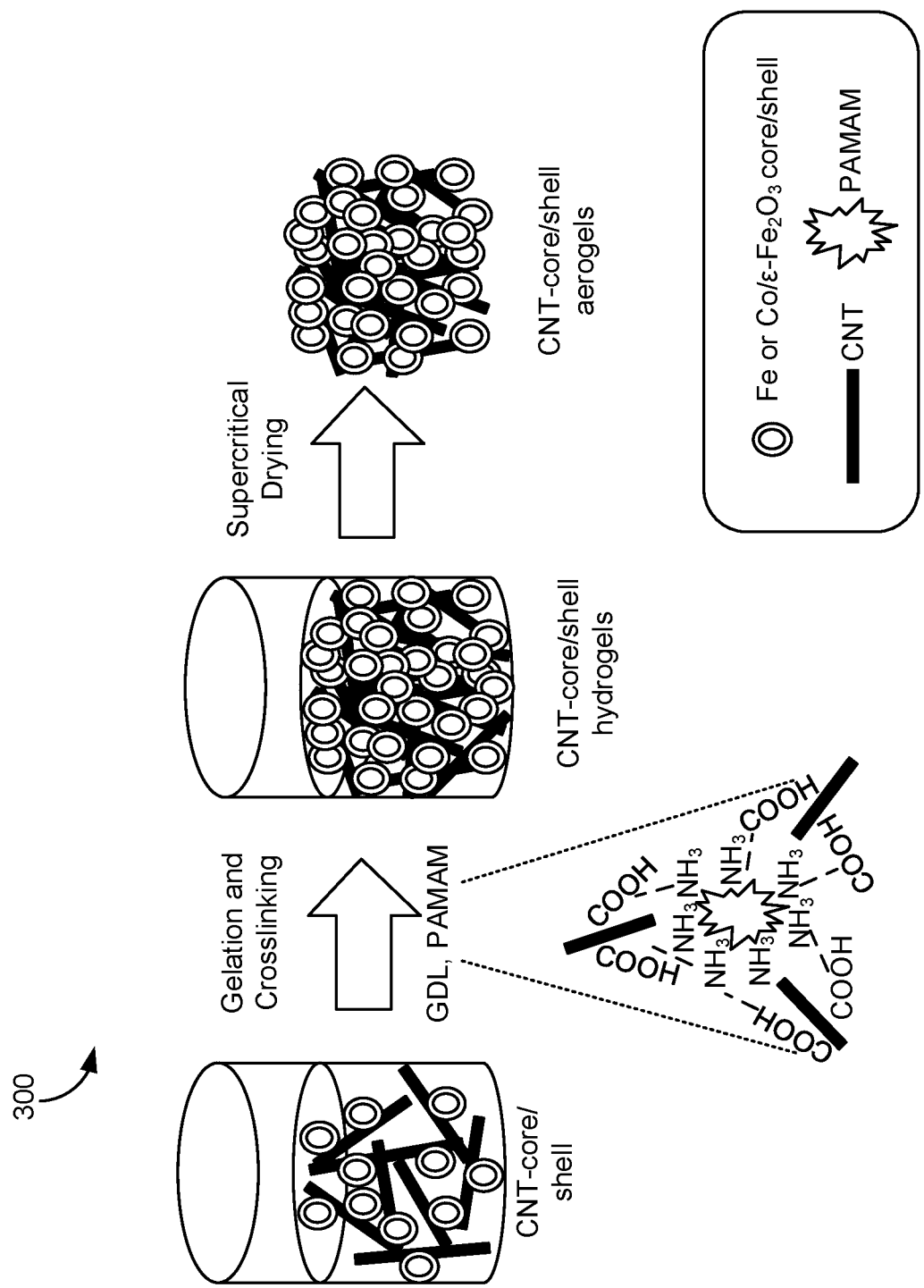
FIG. 3 is a simplified schematic of magnetic core/shell nanostructure/carbon nanotubes (CNT) aerogel composite synthesis, according to one configuration of the presently disclosed inventive concepts.

FIG. 3 is a simplified schematic of synthesis procedure 300 for magnetic core/shell nanostructure-carbon nanotube (CNT) aerogel composites, in accordance with one configuration. As an option, the present procedure 300 may be implemented in conjunction with features from any other configuration listed herein, such as those described with reference to the other FIGS. Of course, however, such procedure 300 and others presented herein may be used in various applications and/or in permutations which may or may not be specifically described in the illustrative approaches listed herein. Further, the procedure 300 presented herein may be used in any desired environment.

A 3D porous structure comprising CNTs and the core/shell nanostructures are formed by the procedure 300 to construct lightweight mm wave absorbers with high mm wave absorption. The CNT-core/shell nanoparticle-based conjugates may be synthesized by known chemical bonding protocols including covalent and/or non-covalent-inspired schemes, gelation (e.g., sol-gel), etc. The oxide shell and CNTs provide a means for surface treatment with suitable functional groups for linkage as would be understood by one having ordinary skill in the art upon reading the present disclosure. Using various chemical bonding protocols, the CNT-core/shell nanoparticle composites may be generated without particle aggregation which may degrade EM absorption properties. The CNT-core/shell nanoparticle composites may be used to fabricate 3D porous, freestanding, magnetically-functionalized CNT-core/shell aerogels by gelation and/or crosslinking individual composites into 3D CNT-core/shell hydrogels, followed by supercritical drying and/or freeze drying of the obtained gels for carbon-based aerogel (e.g., CNT-core/shell aerogel) synthesis.

Specifically, poly(amidoamine) (PAMAN) may be used for crosslinking. The CNT-core/shell nanoparticles may be connected via the carboxyl group on functionalized CNT via electrostatic interactions, facilitated by hydrolyzed products of glucono-d-lactone (GDL) under ideal pH and optimized reagent concentrations as shown in FIG. 3. The amount of core/shell nanoparticle loading in the CNTs, the reagent and CNT concentrations, the resulting aerogel thickness, etc., may be optimized for lightweight mm wave absorbers. In preferred approaches, the core/shell nanostructures are less than 100 mg/cm$^3$.

In preferred approaches, mm wave absorbers described herein are characterized by absorption and/or reflection loss values which are more than −30 dB (e.g., 99.99% absorption) in 5G bands (e.g., between about 28 GHz and about 40 GHz), in E band (e.g., between about 60 GHz and about 90 GHz), and/or in W band (e.g., between about 75 GHz and about 110 GHz), etc., which are associated with commercial wireless and/or satellite communications, military radar targeting, and tracking applications, respectively.

In various approaches, the resulting structure comprising core/shell nanostructures and a support structure may be any form factor known in the art. For example, the resulting structure comprising core/shell nanostructures and a support structure may be in the form of sheets, laminates, wrap cylinders, rods, etc.

In Use

The millimeter wave absorbers described herein may be used in any application where millimeter wave absorption is useful. For example, the millimeter wave absorbers comprising the core/shell nanostructures and support structure may be used in high-speed electronics, mobile phones, laptops, automated vehicles, aviation electronics, radar, military toolkits, etc., or any application using electronic communication systems known in the art. One having ordinary skill in the art would appreciate that the millimeter wave absorbers presented herein may be adapted for use in future electronic communication systems in view of the various approaches described herein.

The inventive concepts disclosed herein have been presented by way of example to illustrate the myriad features thereof in a plurality of illustrative scenarios, approaches, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various approaches have been described above, it should be understood that they have been presented by way of example only, and not limitation. Thus, the breadth and scope of a configuration of the present invention should not be limited by any of the above-described exemplary approaches, but should be defined only in accordance with the following claims and their equivalents.

What is claimed is:

1. A product, comprising:
    a nanostructure having:
        a core; and
        a shell,
        wherein the core has a coercive field of at least 3 kOe,
        wherein the shell has a saturation magnetization of at least 50 emu per gram,
        wherein the nanostructure has an effective thickness for absorbing waves having a frequency between 30 GHz and 300 GHz, wherein the effective thickness is less than or equal to 100 nm.

2. The product of claim 1, comprising a layer external to the core and the shell, wherein the layer comprises at least one dielectric material.

3. The product of claim 2, comprising a support structure supporting a plurality of the nanostructures, wherein the support structure is distinct from the layer.

4. The product of claim 1, comprising a support structure supporting a plurality of the nanostructures, wherein the support structure consists essentially of carbon nanotubes.

5. The product of claim 4, wherein the carbon nanotubes are crosslinked together, wherein at least some of the carbon nanotubes are functionalized for coupling the carbon nanotubes to the nanostructures via electrostatic interactions.

6. The product of claim 1, wherein the nanostructure is in a spherical form factor.

7. The product of claim 1, wherein the nanostructure is in a wrap cylinder form factor.

8. A product, comprising:
    a nanostructure having:
        a core; and
        a shell,
        wherein the shell has a coercive field of at least 3 kOe,
        wherein the core has a saturation magnetization of at least 50 emu per gram,
        wherein the nanostructure has an effective thickness for absorbing waves having a frequency between 30 GHz and 300 GHz, wherein the effective thickness is less than or equal to 100 nm.

9. The product of claim 8, comprising a layer external to the core and the shell, wherein the layer comprises at least one dielectric material.

10. The product of claim 9, comprising a support structure supporting a plurality of the nanostructures, wherein the support structure is distinct from the layer.

11. The product of claim 8, comprising a support structure supporting a plurality of the nanostructures, wherein the support structure consists essentially of carbon nanotubes.

12. The product of claim 11, wherein the carbon nanotubes are crosslinked together, wherein at least some of the carbon nanotubes are functionalized for coupling the carbon nanotubes to the nanostructures via electrostatic interactions.

13. The product of claim 8, wherein the nanostructure is in a spherical form factor.

14. A product, comprising:
    a nanostructure having:
        a core; and
        a shell,
        wherein the shell has a coercive field of at least 3 kOe,
        wherein the core has a saturation magnetization of at least 50 emu per gram,
        wherein the nanostructure is in a wrap cylinder form factor.

15. A method, comprising;
    forming core/shell nanostructures, wherein the core and the shell of each of the nanostructures is magnetic; and
    forming millimeter wave absorbers comprising the core/shell nanostructures and a support structure, wherein each of the core/shell nanostructures has an effective thickness for absorbing waves having a frequency between 30 GHz and 300 GHz, wherein the effective thickness is less than or equal to 100 nm.

16. The method of claim 15, wherein the core of each nanostructure has a coercive field of at least 3 kOe, wherein the shell of each nanostructure has a saturation magnetization of at least 50 emu per gram.

17. The method of claim 15, wherein the shell of each nanostructure has a coercive field of at least 3 kOe, wherein the core of each nanostructure has a saturation magnetization of at least 50 emu per gram.

18. The method of claim 15, wherein the core and/or the shell of each nanostructure comprises at least one dopant material.

19. The method of claim 15, wherein each of the core/shell nanostructures comprises a layer external to the core and the shell thereof, wherein the layer comprises at least one dielectric material, wherein the support structure is distinct from the layer.

20. The method of claim 15, wherein the support structure supports a plurality of the core/shell nanostructures.

21. The method of claim 15, wherein the support structure comprises carbon nanotubes.

22. The method of claim 15, wherein the core/shell nanostructures are in a spherical form factor.

23. The method of claim 15, wherein the core/shell nanostructures are in a wrap cylinder form factor.

24. The method of claim 15, wherein each of the core/shell nanostructures has a density of less than 100 mg/cm$^3$.

25. The method of claim 21, wherein the millimeter wave absorbers consist essentially of the core/shell nanostructures and the carbon nanotubes, the carbon nanotubes being crosslinked together.

26. The method of claim 21, comprising forming the millimeter wave absorbers via gelation of the core/shell nanostructures and the carbon nanotubes, wherein the millimeter wave absorbers consist essentially of the core/shell nanostructures and the carbon nanotubes.

* * * * *